Aug. 19, 1952         J. KUNNEMAN        2,607,137
SCOOP AND REAR APRON ADJUSTMENT FOR CARRY-TYPE SCRAPERS
Filed Aug. 25, 1949                       3 Sheets—Sheet 1
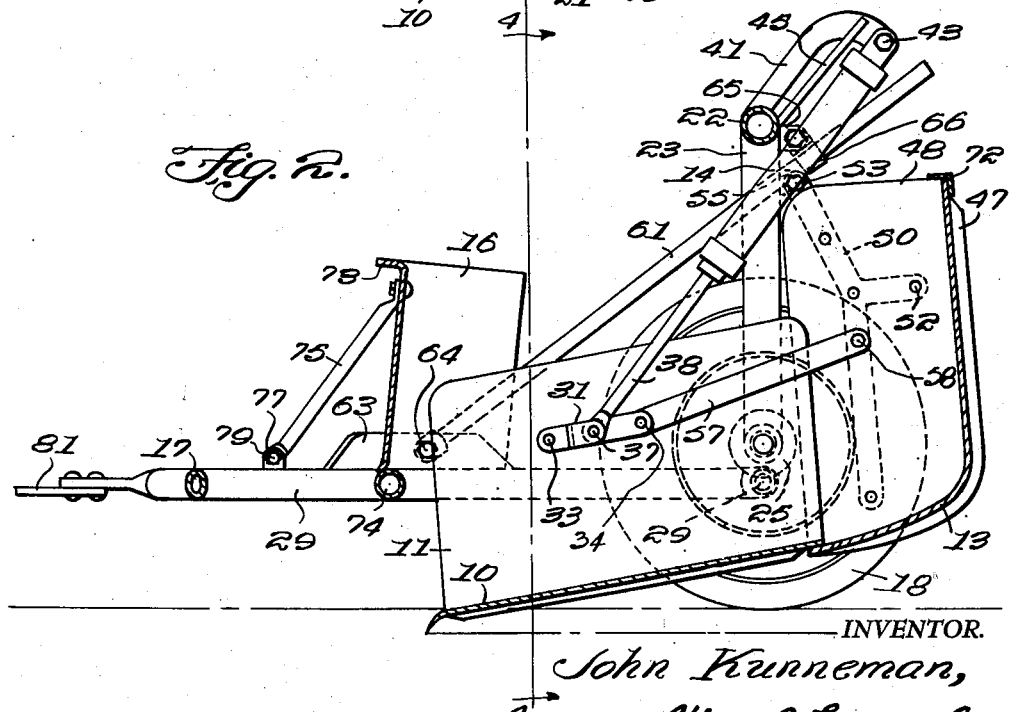
INVENTOR.
John Kunneman,
BY Victor J. Evans & Co.
ATTORNEYS

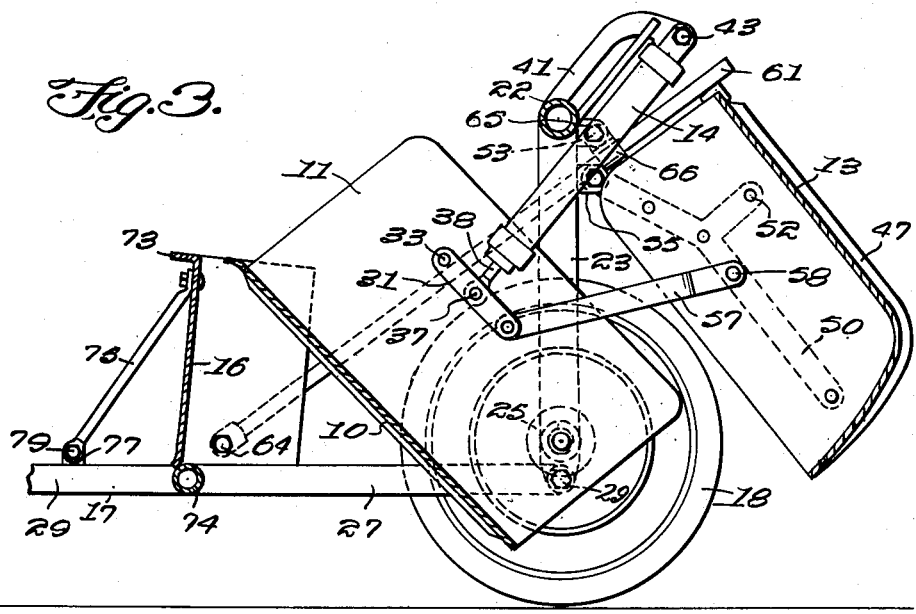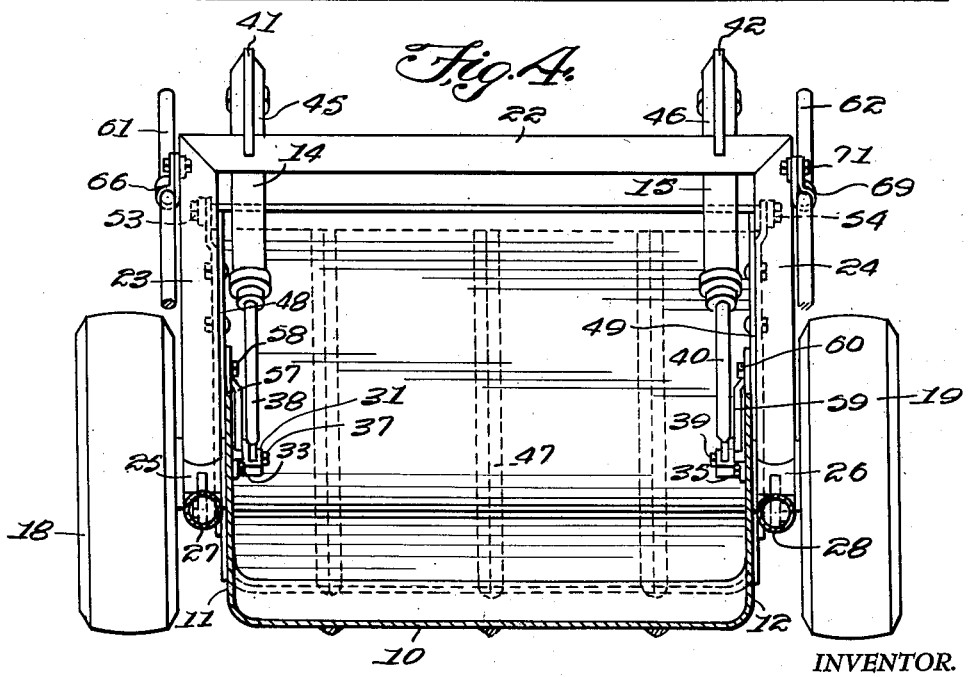

Aug. 19, 1952 J. KUNNEMAN 2,607,137
SCOOP AND REAR APRON ADJUSTMENT FOR CARRY-TYPE SCRAPERS
Filed Aug. 25, 1949 3 Sheets-Sheet 3

INVENTOR.
John Kunneman,
BY Victor J. Evans & Co.
ATTORNEYS

Patented Aug. 19, 1952

2,607,137

UNITED STATES PATENT OFFICE 2,607,137

SCOOP AND REAR APRON ADJUSTMENT FOR CARRY-TYPE SCRAPERS

John Kunneman, Kingfisher, Okla.

Application August 25, 1949, Serial No. 112,379

3 Claims. (Cl. 37—133)

This invention relates to scrapers having buckets in combination therewith and particularly devices for moving dirt and the like, and in particular a tractor propelled carrier having a scraping blade in the form of a forward scoop with a bucket positioned to receive material from the blade and with hydraulic means for actuating the scraping scoop and bucket to scraping and dumping positions.

The purpose of this invention is to provide a combination scraper and carrier wherein the parts readily pick up and carry dirt and the like and in which the parts are readily actuated to dump the dirt.

Various types of dirt pushers and movers have been provided and scrapers in the form of buckets have been used for fills and the like but where scraping buckets of this type have been used they are comparatively small and many trips are required. With this thought in mind this invention contemplates a scraper in the form of a scoop with a receiving bucket having an upwardly extended rear end wherein the two elements coact to provide a relatively large bucket and in which the two parts are separated for dumping.

The object of this invention is, therefore, to provide a combination scraper and carrier in which comparatively large quantities of material are handled and in which the device is readily dumped.

Another object of the invention is to provide a combination scraper and carrier in which comparatively large quantities of material are handled with very little pulling power.

A further object of the invention is to provide a combination dirt scraper and carrier which is of a simple and economical construction.

With these and other objects and advantages in view the invention embodies a chassis mounted on wheels with a transversely disposed vertically positioned apron at the front, a scraper blade forming the forward end of a forward scoop pivotally mounted in the chassis and an up ended bucket also pivotally mounted on the chassis and positioned to coact with the scoop and its scraper blade for providing a carrier.

Other features and advantages of the invention will appear from the following description taken in connection with the drawings wherein:

Figure 1 is a view showing a side elevation of the combination scraper and carrier with the parts in the scraping position.

Figure 2 is a longitudinal section through the device with the parts in the position illustrated in Figure 1.

Figure 3 is a similar section showing the parts in the dumping position.

Figure 4 is a cross section through the combination scraper and carrier taken on line 4—4 of Figure 2.

Figure 5:
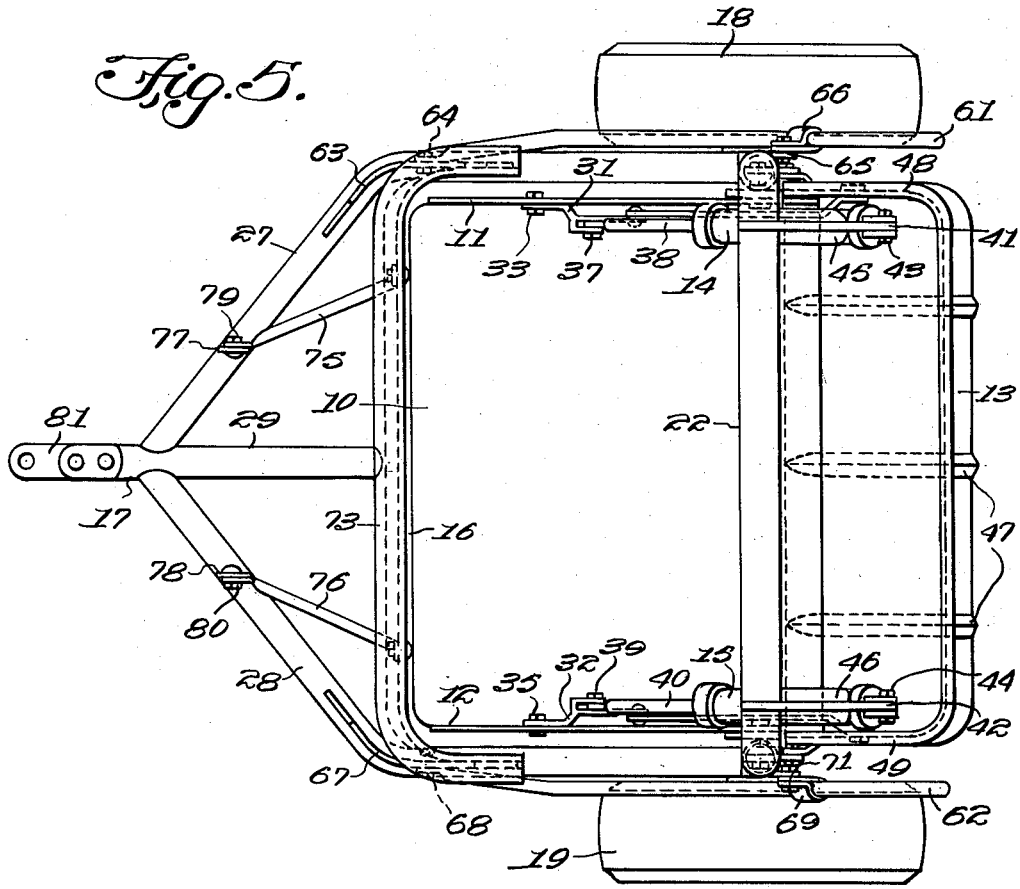
Figure 5 is a plan view of the device with the parts in the position illustrated in Figures 1 and 2.

Referring now to the drawings wherein like reference characters denote corresponding parts the combination scraper and carrier of this invention includes a scraper blade 10 which with the side walls 11 and 12 form a scoop 9, a bucket 13 positioned to receive dirt or other material from the scoop, hydraulic cylinders 14 and 15, an apron 16 and a chassis or frame 17 which is mounted on wheels 18 and 19.

The scraper 10 forms the bottom of the scoop as illustrated in Figures 1, 2 and 4 and the blade may be provided with a reinforcing plate 20 having a wood filler therein as indicated by the numeral 21.

The scoop 9 and the bucket 13 are mounted on a U-shaped tubular frame having an upper horizontally disposed bar 22 and vertical end bars 23 and 24 and the wheels 18 and 19 are journaled in hubs 25 and 26 at the lower ends of the members 23 and 24. The chassis or frame 17 includes tubular side members 27 and 28 extended outwardly from a tongue 29 and the rear ends of the side members 27 and 28 are connected to the lower ends of the members 23 and 24.

The side plates 11 and 12 of the scoop 9 are pivotally attached by bolts 29 and 30 to the rear ends of the side beams 27 and 28 and these side plates are provided with brackets 31 and 32, the ends of the bracket 31 being connected to the plate 11 by bolts 33 and 34 and the ends of the bracket 32 being connected to the plate 12 by bolts 35 and 36.

The bracket 31 of the plate 11 is pivotally connected by a pin 37 to the end of a connecting rod 38 of the hydraulic cylinder 14, and the bracket 32 of the plate 12 is pivotally connected by a pin 39 to the connecting rod 40 of the hydraulic cylinder 15, and with the hydraulic cylinders pivotally mounted in the outer ends of arms 41 and 42 extended from the horizontal bar 22 carried by the upper ends of the members 23 and 24, respectively. The scoop is pivoted through the side walls 11 and 12 thereof on the pins 29 and 30 whereby the hydraulic cylinders will swing the scoop upwardly about pins 29 and 30 as the pistons are drawn into the cylinders until the scoop assumes the position shown in Figure 3. The cylinders 14 and 15 are pivotally mounted through bolts 43 and 44 to the upper ends of the arms 41 and 42, respectively and the arms are reinforced by braces 45 and 46, respectively.

The arcuate lower section of the bottom of the bucket 13 is shaped as illustrated in Figure 2 with reinforcing bars 47 on the outer surface and with side plates 48 and 49 extended from the edges corresponding with the sides 11 and 12 of the scoop 9. The side plates 48 and 49 are also reinforced by braces 50 and 51 respectively and the braces are attached to the side plates by bolts 52. The bucket is pivotally mounted through the upper ends of the braces on the vertical side members 23 and 24 of the U-shaped frame by bolts 53 and 54 which are held in ears 55 and 56, respectively that extend from the rear surfaces of the vertical members. The brace 50 on one side of the bucket is connected by a link 57 to the bolt 34 of the bracket 31 on the side plate 11 of the scraper and the opposite end of the link is connected by a bolt 58 to the brace. The brace 51 is also connected by a link 59 to the side wall 12 of the scraper through the bolt 36, the opposite end of the link 59 being connected to the brace 51 by a bolt 60.

The upper ends of the vertical members 23 and 24 of the U-shaped frame are adjustably connected to the members 27 and 28 of the chassis 17 by diagonally disposed braces 61 and 62, the brace 61 being pivotally mounted on a flange 63 of the member 27 by a bolt 64 and connected to an ear 65 on the upper end of the member 23 by a clamp 66, and the brace 62 is pivotally connected to a flange 67 on the side beam 28 by a bolt 68 with the upper end connected to the member 24 by a clamp 69 which is connected to an ear 70 by a bolt 71. By this means the position of the scraper blade 10 may be elevated or lowered in relation to the chassis 17. A reinforcing angle 72 is positioned across the rear end of the bucket as shown in Figures 1 and 2 to provide supporting means for the parts thereof.

The apron 16 which is provided with a flange 73 on the upper edge is mounted on a cross bar 74 and supported by braces 75 and 76, the lower ends of which are connected to extensions 77 and 78 on the beams 27 and 28 by bolts 79 and 80, respectively.

The forward end of the tongue 29 may be provided with a clevis 81 or other means by which the device may be attached to a tractor or the like.

With the parts arranged in this manner the combination scraper and carrier is first drawn over dirt or the like with the parts in the position illustrated in Figures 1 and 2 and as the scoop and bucket are filled with dirt the scoop and bucket are adjusted to a position wherein the scraper blade is free of the ground whereby the material may be carried to substantially any point desired. When it is desired to dump the material pressure is applied to the hydraulic jacks or cylinders which actuate the scoop and bucket to the positions illustrated in Figure 3. Pressure may then be applied to the opposite end of the cylinder which will force the scoop and bucket downwardly so that they are returned to the position illustrated in Figures 1 and 2.

It will be understood that modifications may be made in the design and arrangement of the parts without departing from the spirit of the invention.

What is claimed is:

1. A combination scraper and carrier comprising a chassis mounted on wheels, a scraper blade having side walls providing a scoop, means pivotally mounting the scoop on the chassis, an inverted U-shaped frame extended upwardly from the chassis, diagonal braces adjustably connecting the upper end of the U-shaped frame to the chassis, a bucket having a back extended into an arcuate bottom and also having side walls, means pivotally mounting the bucket on the U-shaped frame with the forward end of the bottom positioned to receive material from the scoop, and arms extended upwardly from the U-shaped frame, hydraulic cylinders pivotally mounted on the side walls of the scoop and positioned with the upper ends thereof connected to the upper ends of the arms extended from the U-shaped frame, common means adjusting the position of the scoop and bucket into scraping, carrying and dumping positions as the hydraulic cylinders are actuated.

2. In a combination scraper and carrier, the combination which comprises a chassis mounted on wheels and having a transversely disposed vertically positioned apron mounted thereon, a forward scoop having side walls providing a chute positioned to follow the apron, means pivotally mounting the scoop on the chassis, an inverted U-shaped frame extended upwardly from the chassis, diagonally disposed braces adjustably connecting the upper end of the U-shaped frame with the chassis, a bucket having a back extended into an arcuate bottom and having side walls, means pivotally mounting the bucket on the upper end of the said inverted U-shaped frame, links connecting the bucket to the scoop, and hydraulic cylinders carried by the upper end of the said inverted U-shaped frame and having piston rods connected to the side walls of the scoop.

3. In a combination scraper and carrier, the combination which comprises a chassis mounted on wheels and having a transversely disposed vertically positioned apron mounted thereon, a scraper blade having a bottom and side walls providing a scoop positioned to follow the apron, means pivotally mounting the scoop on the chassis, an inverted U-shaped frame extended upwardly from the chassis, diagonally disposed braces adjustably connecting the upper end of the U-shaped frame with the chassis, a bucket having a back extended into an arcuate bottom and having side walls, means pivotally mounting the bucket on the upper end of the said inverted U-shaped frame, links connecting the bucket to the scoop, and hydraulic cylinders carried by the upper end of the said inverted U-shaped frame and having piston rods connected to the side walls of the scoop, said scoop and bucket positioned whereby with the piston rods of the cylinders extended the forward end of the bottom of the bucket coacts with the rear end of the scoop to provide a continuous material holding body, and with the said piston rods drawn into the cylinders both the scoop and bucket are simultaneously actuated to dumping positions.

JOHN KUNNEMAN.

REFERENCES CITED

The following references are of record in the file of this patent:

UNITED STATES PATENTS

| Number | Name | Date |
| --- | --- | --- |
| 420,960 | Rath | Feb. 11, 1890 |
| 1,811,030 | Shaw | June 23, 1931 |
| 2,215,026 | Austin | Sept. 17, 1940 |
| 2,408,806 | Mork | Oct. 8, 1946 |
| 2,528,046 | Engler | Oct. 31, 1950 |